United States Patent
Oshiki et al.

(10) Patent No.: US 11,926,637 B2
(45) Date of Patent: Mar. 12, 2024

(54) METAL-OXO COMPLEX AND METHOD FOR PRODUCTION THEREOF

(71) Applicant: RIMTEC Corporation, Tokyo (JP)

(72) Inventors: Toshiyuki Oshiki, Okayama (JP); Michiru Kamada, Tokyo (JP)

(73) Assignee: RIMTEC CORPORATION, Tokyo (JP)

( * ) Notice: Subject to any disclaimer, the term of this patent is extended or adjusted under 35 U.S.C. 154(b) by 568 days.

(21) Appl. No.: 17/287,336

(22) PCT Filed: Oct. 21, 2019

(86) PCT No.: PCT/JP2019/041320
§ 371 (c)(1),
(2) Date: Apr. 21, 2021

(87) PCT Pub. No.: WO2020/085306
PCT Pub. Date: Apr. 30, 2020

(65) Prior Publication Data
US 2021/0355147 A1    Nov. 18, 2021

(30) Foreign Application Priority Data
Oct. 26, 2018 (JP) ................ 2018-202036

(51) Int. Cl.
*C07F 11/00* (2006.01)
*C08G 61/08* (2006.01)

(52) U.S. Cl.
CPC ............ *C07F 11/005* (2013.01); *C08G 61/08* (2013.01); *C08G 2261/228* (2013.01); *C08G 2261/3325* (2013.01); *C08G 2261/418* (2013.01)

(58) Field of Classification Search
CPC . C07F 11/005; C08G 61/08; C08G 2261/228; C08G 2261/3325; C08G 2261/418
USPC ....................................................... 526/281
See application file for complete search history.

(56) References Cited

U.S. PATENT DOCUMENTS

| | | | | | |
|---|---|---|---|---|---|
| 3,424,772 | A | * | 1/1969 | Moshier ............ | C07F 9/005 556/42 |
| 6,121,473 | A | * | 9/2000 | Schrock ............ | B01J 31/2265 556/63 |
| 11,702,436 | B2 | * | 7/2023 | Gulyas ............. | C07F 11/00 548/402 |
| 2002/0111446 | A1 | * | 8/2002 | Mukerjee ........... | C08G 61/08 526/282 |
| 2020/0369697 | A1 | * | 11/2020 | Schrock ............ | B01J 31/24 |
| 2021/0017207 | A1 | * | 1/2021 | Gulyas ............. | C07F 11/00 |

FOREIGN PATENT DOCUMENTS

JP    2002-504487 A    2/2002

OTHER PUBLICATIONS

Chan et al. "C—H Activation and Proton Transfer Initiate Alkene Metathesis Activity of the Tungsten(IV)-Oxo Complex", Journal of Am. Chem. Soc, 2018, 140, pp. 11395-11401 (Year: 2018).*
Bukhryakov et al. "Synthesis of Molybdenum Oxo Alkylidene Complexes through Addition of Water to an Alkylidene Complex", Journal of Am. Chem. Soc, 2018, 140, pp. 2797-2800 (Year: 2018).*
Chan, Ka Wing et al.,: "C—H Activation and Proton Transfer Initiate Alkene Metathesis Activity of the Tungsten(IV)-Oxo Complex", Journal of the American Chemical Society, vol. 140, No. 36, Sep. 12, 2018, pp. 11395-11401; Cited in Extended European Search Report dated Jun. 22, 2022. (7 pages).
Extended (Supplementary) European Search Report dated Jun. 22, 2022, issued in counterpart EP Application No. 19874822.0. (7 pages).
International Search Report dated Dec. 17, 2019, issued in counterpart International Application No. PCT/JP2019/041320. (2 pages).

* cited by examiner

*Primary Examiner* — Michael M. Bernshteyn
(74) *Attorney, Agent, or Firm* — WHDA, LLP

(57) ABSTRACT

The present invention provides a metal-oxo complex represented by the following general formula (1),

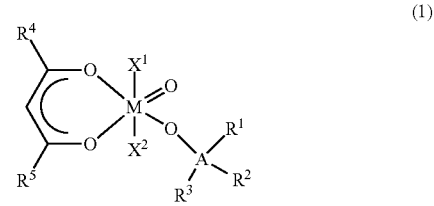

(1)

wherein in the general formula (1) above, "M" represents a molybdenum atom or a tungsten atom; "A" represents a carbon atom, a silicon atom, a germanium atom, a tin atom or a lead atom; $X^1$ and $X^2$ each independently represent a halogen atom; $R^1$ to $R^5$ each independently represent a hydrogen atom, a straight or branched chain alkyl group that is substituted or unsubstituted and has 1 to 20 carbon atoms, or a substituted or unsubstituted aryl group having 6 to 20 carbon atoms; each of $R^1$ to $R^3$ may be bonded to one another to form a ring.

9 Claims, No Drawings

METAL-OXO COMPLEX AND METHOD FOR PRODUCTION THEREOF

TECHNICAL FIELD

The present invention relates to a metal-oxo complex and a method for producing the same. More particularly, the present invention relates to a metal-oxo complex that is suitably used as a metathesis catalyst precursor and is stable in air and a method for producing the same.

BACKGROUND ART

Transition metal carbene complexes such as ruthenium carbene complexes that are referred to as Grubbs catalyst and molybdenum carbene complexes and tungsten carbene complexes that are referred to as Schrock catalyst are known as highly active catalysts for metathesis reactions (hereinafter also referred to as "metathesis catalyst") and widely used.

Among the transition metal carbene complexes, molybdenum carbene complexes and tungsten carbene complexes have extremely high activity as a metathesis catalyst and can proceed metathesis reactions stereospecifically by appropriately selecting a substituent or a ligand of a metal, for example, as disclosed in Patent Document 1. Therefore, various studies have been conducted on molybdenum carbene complexes and tungsten carbene complexes.

However, there has been a problem that conventional molybdenum carbene complexes and tungsten carbene complexes according to the techniques disclosed in Patent Document 1 are inferior in stability in air compared with ruthenium carbene complexes and the like, and their handling is not easy (poor handleability).

RELATED ART

Patent Document

PATENT DOCUMENT 1: Japanese Patent Publication No. 2002-504487

SUMMARY OF THE INVENTION

Problem to be Solved by the Invention

The present invention has been made in consideration of such circumstances. The present invention aims to provide a metal-oxo complex that is suitably used as a metathesis catalyst precursor and is stable in air and a method for producing the same.

Means for Solving the Problem

The present inventors have conducted studies to achieve the above object, and have found that the above object can be achieved by a metal-oxo complex produced by coordinating a group represented by —OA($R^1R^2R^3$) ("A" represents a carbon atom, a silicon atom, a germanium atom, a tin atom or a lead atom; $R^1$ to $R^3$ each independently represent a hydrogen atom, a straight or branched chain alkyl group that is substituted or unsubstituted and has 1 to 20 carbon atoms, or a substituted or unsubstituted aryl group having 6 to 20 carbon atoms; each of $R^1$ to $R^3$ may be bonded to one another to form a ring) and β-diketone to a molybdenum atom or a tungsten atom. Thus, the present inventors have completed the present invention.

That is, according to the present invention, a metal-oxo complex represented by the following general formula (1) is provided.

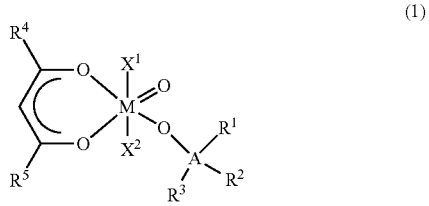

(1)

In the general formula (1) above, "M" represents a molybdenum atom or a tungsten atom; "A" represents a carbon atom, a silicon atom, a germanium atom, a tin atom or a lead atom; $X^1$ and $X^2$ each independently represent a halogen atom; $R^1$ to $R^5$ each independently represent a hydrogen atom, a straight or branched chain alkyl group that is substituted or unsubstituted and has 1 to 20 carbon atoms, or a substituted or unsubstituted aryl group having 6 to 20 carbon atoms; each of $R^1$ to $R^3$ may be bonded to one another to form a ring.

In the general formula (1), "A" is preferably a carbon atom or a silicon atom.

In the general formula (1), at least one of $R^4$ and $R^5$ is a substituted or unsubstituted branched chain alkyl group having 3 to 20 carbon atoms.

The metal-oxo complex according to the present invention is preferably any one of the compounds represented by the following formulae (2) to (10).

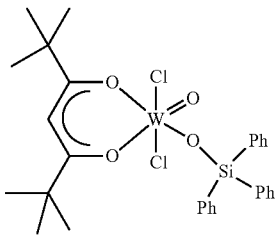

(2)

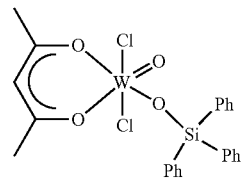

(3)

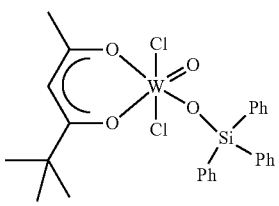

(4)

-continued (5)
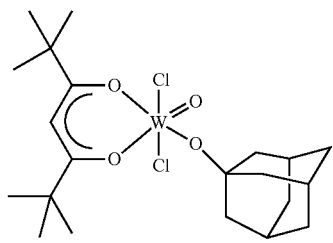

(6)
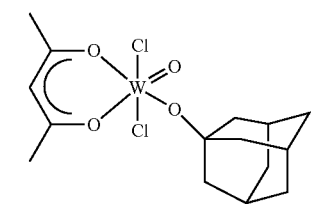

(7)
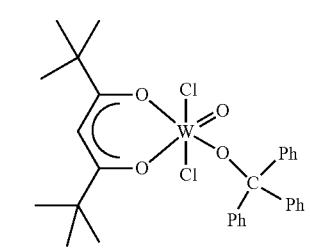

(8)
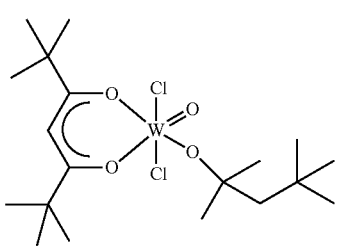

(9)
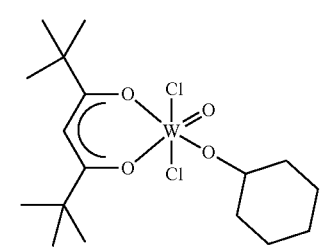

(10)
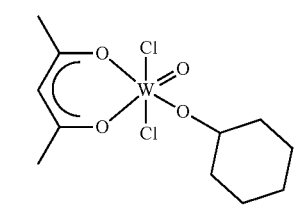

Further, according to the present invention, a method for producing the above metal-oxo complex comprising: reacting a compound represented by the general formula (11) of $MOX^1{}_2X^2{}_2$ with a compound represented by the following general formula (12) below; and then reacting with a compound represented by the following general formula (13) is provided.

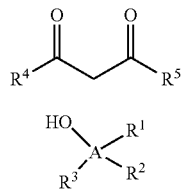

(12)

(13)
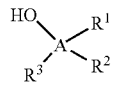

In the general formulae (11) to (13) above, "M" represents a molybdenum atom or a tungsten atom; "A" represents a carbon atom, a silicon atom, a germanium atom, a tin atom or a lead atom; $X^1$ and $X^2$ each independently represent a halogen atom; $R^1$ to $R^5$ each independently represent a hydrogen atom, a straight or branched chain alkyl group that is substituted or unsubstituted and has 1 to 20 carbon atoms, or a substituted or unsubstituted aryl group having 6 to 20 carbon atoms; each of $R^1$ to $R^3$ may be bonded to one another to form a ring.

Furthermore, according to the present invention, a method for producing a polymer comprising: contacting the above metal-oxo complex with an organometallic compound to activate the metal-oxo complex; and metathesis polymerizing a norbornene-based monomer in the presence of the activated metal-oxo complex is provided.

In the method for producing the polymer according to the present invention, the organometallic compound is an organometallic compound of a metal of groups 11 to 14 of the periodic table.

Moreover, according to the present invention, a metathesis polymerization catalyst produced by reacting the above metal-oxo complex with an organometallic compound is provided.

In the metathesis polymerization catalyst according to the present invention, the organometallic compound is an organometallic compound of a metal of groups 11 to 14 of the periodic table.

Effects of Invention

According to the present invention, a metal-oxo complex that is suitably used as a metathesis catalyst precursor and stable in air, as well as a method for producing such a metal-oxo complex, and a method for producing a polymer using such a metal-oxo complex are provided. Further, according to the present invention, a metathesis polymerization catalyst comprising such a metal-oxo complex is also provided.

DESCRIPTION OF EMBODIMENTS

The metal-oxo complex of the present invention is a metal-oxo complex represented by the following general formula (1).

(1)
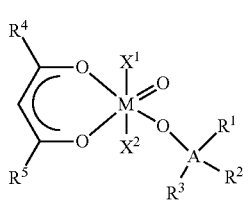

In the general formula (1) above, "M" represents a molybdenum atom or a tungsten atom; "A" represents a carbon atom, a silicon atom, a germanium atom, a tin atom or a lead atom; $X^1$ and $X^2$ each independently represent a halogen atom; $R^1$ to $R^5$ each independently represent a hydrogen atom, a straight or branched chain alkyl group that is substituted or unsubstituted and has 1 to 20 carbon atoms, or a substituted or unsubstituted aryl group having 6 to 20 carbon atoms. Further, each of $R^1$ to $R^3$ may be bonded to one another to form a ring.

In the above general formula (1), "M" represents a molybdenum atom or a tungsten atom that is a central metal of the complex. The central metal of the metal-oxo complex of the present invention may be any of the molybdenum atom and the tungsten atom, but the tungsten atom is preferred from the viewpoint of superior catalytic activity.

The compound represented by the above general formula (1) has a group represented by —OA($R^1R^2R^3$) as a ligand. The metal-oxo complex of the present invention has a structure in which the group represented by —OA($R^1R^2R^3$) and β-diketone are coordinated, thereby the metal-oxo complex is supposed to exhibit excellent stability in air. Therefore, the metal-oxo complex of the present invention is excellent in handleability. Additionally, the metal-oxo complex of the present invention is capable of being isolated and purified to high purity as a single component in addition to being stable in air.

In the above general formula (1), "A" represents a carbon atom, a silicon atom, a germanium atom, a tin atom, or a lead atom, and is preferably a carbon atom or a silicon atom from the viewpoint of further enhancing the stability in air of the metal-oxo complex.

$R^1$ to $R^3$ constituting the group represented by —OA($R^1R^2R^3$) each independently represent a hydrogen atom, a straight or branched chain alkyl group that is substituted or unsubstituted and has 1 to 20 carbon atoms, or a substituted or unsubstituted aryl group having 6 to 20 carbon atoms. $R^1$ to $R^3$ are bonded to one another to form a ring or are not bonded to one another. The straight or branched chain alkyl group that is substituted or unsubstituted and has 1 to 20 carbon atoms is not particularly limited to, and specific examples thereof include a methyl group, an ethyl group, an isopropyl group, a t-butyl group, an n-butyl group, a 2,2-dimethylpropyl group, and a 2-methyl-2-phenylethyl group and the like. The substituted or unsubstituted aryl group having 6 to 20 carbon atoms is not particularly limited to, and specific examples thereof include a phenyl group, a 4-methylphenyl group, a 2,6-dimethylphenyl group, a 2,6-diisopropylphenyl group, a mesityl group, and the like. The groups represented by $R^1$ to $R^3$ may be the same group or groups that differ from one another.

$R^1$ to $R^3$ may be bonded to one another to form a ring. In this case, specific examples of the group represented by -A($R^1R^2R^3$) constituting the group represented by —OA($R^1R^2R^3$) (where "A" is a carbon atom) include a cyclopropyl group, a cyclobutyl group, a cyclopentyl group, a cyclohexyl group, a cycloheptyl group, a cyclooctyl group, a cyclononyl group, a cyclodecyl group, a cycloundecyl group, a cyclododecyl group, a norbornyl group, a bornyl group, an isobornyl group, a decahydronaphthyl group, a tricyclodecanyl group, an adamantyl group, and the like. These groups may have a substituent. Examples of the substituent include a methyl group, an ethyl group, an isopropyl group, a t-butyl group, an n-butyl group, a 2,2-dimethylpropyl group, a phenyl group, and the like.

In the compound represented by the above general formula (1), $R^4$ and $R^5$ are groups bonded to a β-diketone structure as a ligand, and $R^4$ and $R^5$ each independently represent a hydrogen atom, a straight or branched chain alkyl group that is substituted or unsubstituted and has 1 to 20 carbon atoms, or a substituted or unsubstituted aryl group having 6 to 20 carbon atoms. The straight or branched chain alkyl group that is substituted or unsubstituted and has 1 to 20 carbon atoms is not particularly limited to, and specific examples thereof include a methyl group, an ethyl group, an isopropyl group, a t-butyl group, an n-butyl group, a 2,2-dimethylpropyl group, and a 2-methyl-2-phenylethyl group and the like. The substituted or unsubstituted aryl group having 6 to 20 carbon atoms is not particularly limited to, and specific examples thereof include a phenyl group, a 4-methylphenyl group, a 2,6-dimethylphenyl group, a 2,6-diisopropylphenyl group, a mesityl group, and the like. The groups represented by $R^4$ and $R^5$ may be the same group or groups that differ from each other.

When the metal-oxo complex of the present invention is used as a metathesis catalyst precursor, at least one of $R^4$ and $R^5$ is preferably a branched chain alkyl group that is substituted or unsubstituted and has 3 to 20 carbon atoms, and more preferably a t-butyl group, from the viewpoint of further enhancing solubility in a monomer used for obtaining a polymer. In particular, it is still preferable that both $R^4$ and $R^5$ are branched chain alkyl groups that are substituted or unsubstituted and have 3 to 20 carbon atoms, and it is particularly preferable that both $R^4$ and $R^5$ are t-butyl groups, from the viewpoint of still further enhancing solubility in a monomer used for obtaining a polymer.

In the above general formula (1), $X^1$ and $X^2$ each independently represent a halogen atom. Examples of the halogen atom include a chlorine atom, a bromine atom, and an iodine atom. Among these, a chlorine atom is preferred.

In the metal-oxo complex of the present invention, among the compounds represented by the above general formula (1), compounds represented by the following formulae (2) to (10) are preferred, compounds represented by the following formulae (2), (4), (5), (6), (7), and (8) are more preferred, compounds represented by the following formulae (2), (5), (6), and (8) are still more preferred, compounds represented by the following formulae (2), (5), and (8) are further preferred, compounds represented by the following formulae (2) and (5) are still further preferred, and compounds represented by the following formula (2) are particularly preferred.

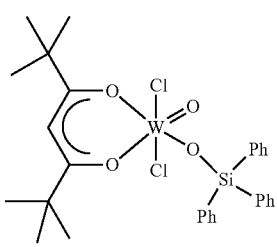

(2)

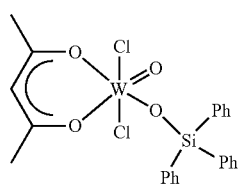

(3)

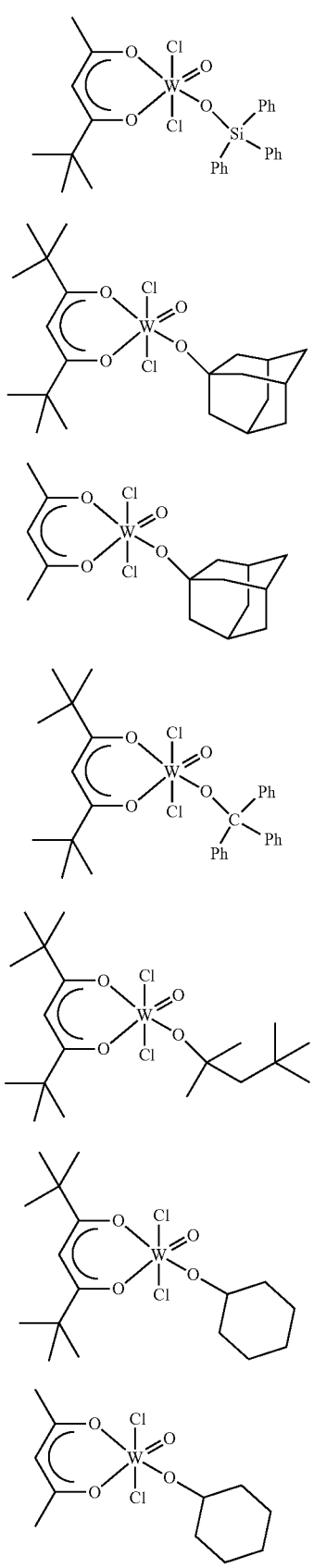

(4)

(5)

(6)

(7)

(8)

(9)

(10)

The method for producing the metal-oxo complex of the present invention represented by the above general formula (1) is not particularly limited, and for example, according to the method for producing the metal-oxo complex of the present invention described below, the metal-oxo complex of the present invention can be suitably obtained. In other words, the method for producing the metal-oxo complex of the present invention is to produce the metal-oxo complex of the present invention represented by the above general formula (1) by reacting a compound represented by the general formula (11): $MOX^1{}_2X^2{}_2$ with a compound represented by the following general formula (12) and then reacting with a compound represented by the following general formula (13).

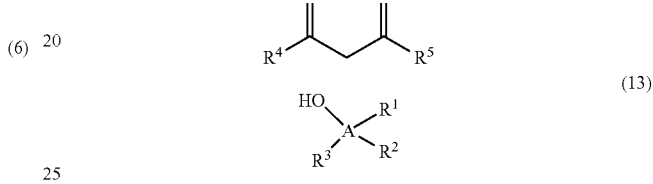

In the general formulae (11) to (13), "M", "A", $X^1$, $X^2$, and $R^1$ to $R^5$ represent the same as those represented by "M", "A", $X^1$, $X^2$, and $R^1$ to $R^5$ in the general formula (1), respectively, and the preferred embodiment is the same. Similarly in the same manner as the above general formula (1), $R^1$ to $R^3$ are bonded to one another to form a ring or are not bonded to one another.

In the method for producing the metal-oxo complex of the present invention, a method for reacting the compound represented by the above general formula (11) with the compound represented by the above general formula (12) is not particularly limited, and examples thereof include a method for mixing these compounds in a solvent and the like. The reaction temperature is not particularly limited, and is preferably 0 to 100° C., more preferably 25 to 60° C., and the reaction time is not particularly limited, and is preferably 1 to 48 hours, more preferably 2 to 24 hours. The reaction atmosphere is preferably an inert gas atmosphere.

The solvent used in the reaction is not particularly limited as long as the solvent is inert to the compound represented by the above general formula (11) and the compound represented by the above general formula (12) and does not prevent these reactions. Examples thereof include straight or branched chain aliphatic hydrocarbons such as propane, n-butene, isobutane, n-pentane, isopentane, n-hexane, propene, 1-butene, isobutene, trans-2-butene, cis-2-butene, 1-pentene, 2-pentene, 1-hexene, 2-hexene, and n-heptane; alicyclic hydrocarbons such as cyclopentane and cyclohexane; aromatic hydrocarbons such as benzene, ethylbenzene, toluene, and xylene; ether compounds such as tetrahydrofuran and diethyl ether; and the like.

Then, the compound represented by the above general formula (13) is added to the reactant obtained by the above reaction, and the compound represented by the above general formula (13) is reacted. A method for reacting these compounds is not particularly limited, and examples thereof include a method for mixing these compounds in a solvent and the like. The reaction temperature is not particularly limited, and is preferably 0 to 150° C., more preferably 25 to 80° C., and the reaction time is not particularly limited, and is preferably 1 to 72 hours, more preferably 2 to 48 hours. The reaction atmosphere is preferably an inert gas atmosphere, and as the solvent, the same as those described above can be used.

When the metal-oxo complex of the present invention represented by the above general formula (1) is obtained in a state of a reaction solution by the method for producing the metal-oxo complex of the present invention, the metal-oxo complex of the present invention represented by the above general formula (1) can be obtained by distilling off a volatile component such as a solvent. After removing the volatile component such as a solvent, washing with a solvent or recrystallization may be performed if necessary.

According to such a method for producing the metal-oxo complex of the present invention, the metal-oxo complex of the present invention represented by the above general formula (1) can be suitably obtained as a distinct single component with high purity. The metal-oxo complex of the present invention represented by the above general formula (1) thus obtained is capable of being isolated and purified to high purity in addition to being stable in air. In addition, the metal-oxo complex of the present invention represented by the above general formula (1) can be suitably used as a metathesis catalyst precursor having potentially high metathesis catalytic activity, and among others, can be particularly suitably used as a metathesis catalyst precursor for metathesis polymerization of a norbornene-based monomer.

When the metal-oxo complex of the present invention represented by the above general formula (1) is used as a metathesis catalyst precursor, in general, it is activated by contacting with an organometallic compound commonly used in a metathesis polymerization catalyst, and is used in a metathesis polymerization reaction in an activated state. In other words, the metal-oxo complex of the present invention represented by the above general formula (1) can be transformed to a metathesis polymerization catalyst by contacting with an organometallic compound to react the metal-oxo complex of the present invention represented by the above general formula (1) with the organometallic compound. In particular, the metal-oxo complex of the present invention represented by the above general formula (1) can be easily and efficiently activated by an organometallic compound commonly used in a metathesis polymerization catalyst. Further, since the metal-oxo complex of the present invention represented by the above general formula (1) is composed of a single component, influence of impurities and the like is limited, and the reaction can be proceeded stoichiometrically.

As the organometallic compound as the activator, for example, an organometallic compound of a metal of groups 11 to 14 of the periodic table can be used. Specific examples thereof include alkylaluminum compounds such as triethylaluminum, triisobutylaluminum, trimethylaluminum, tributylaluminum, trihexylaluminum and trioctylaluminum; alkylaluminum halide compounds such as ethylaluminum dichloride, diethylaluminum chloride, diisobutylaluminum chloride, ethylaluminum sesquichloride, isobutylaluminum dichloride, and dioctylaluminum iodide; alkylaluminum alkoxide compounds such as diethylaluminum ethoxide; organotin compounds such as tetrabutyltin; organozinc compounds such as diethylzinc; organomagnesium compounds such as isopropylmagnesium chloride; and the like. Among these, alkylaluminum compounds and alkylaluminum halide compounds are preferable, triethylaluminum, trioctylaluminum, diethylaluminum chloride and dioctylaluminum iodide are more preferable, and triethylaluminum and diethylaluminum chloride are still more preferable. The organometallic compound as the activator can be used alone or in combination of two or more.

The norbornene-based monomer used in the metathesis polymerization of the norbornene-based monomer may be a compound having a norbornene structure, and is not particularly limited. Specific examples thereof include:

dicyclopentadienes such as dicyclopentadiene and methyldicyclopentadiene;

tetraclododecenes such as tetracyclo[6.2.1.1$^{3,6}$.0$^{2,7}$]dodec-4-ene, 9-ethylidene tetracyclo[6.2.1.1$^{3,6}$.0$^{2,7}$]dodec-4-ene, 9-phenyltetracyclo[6.2.1.1$^{3,6}$.0$^{2,7}$]dodec-4-ene, tetracyclo[6.2.1.1$^{3,6}$.0$^{2,7}$]dodec-9-ene-4-carboxylic acid, and tetracyclo[6.2.1.1$^{3,6}$.0$^{2}$,7]dodec-9-ene-4,5-dicarboxylic acid anhydride;

norbornenes such as 2-norbornene, 5-ethylidene-2-norbornene, 5-vinyl-2-norbornene, 5-phenyl-2-norbornene, 5-norbornen-2-yl acrylate, 5-norbornen-2-yl methacrylate, 5-norbornene-2-carboxylic acid, 5-norbornene-2,3-dicarboxylic acid, and 5-norbornene-2,3-dicarboxylic acid anhydride;

oxanorbornenes such as 7-oxa-2-norbornene, 5-ethylidene-7-oxa-2-norbornene;

cyclic olefins with four or more rings such as tetracyclo[9.2.1.0$^{2,10}$.0$^{3,8}$]tetradeca-3,5,7,12-tetraene (also known as 1,4-methano-1,4,4a,9a-tetrahydro-9H-fluorene), pentacyclo[6.5.1.1$^{3,6}$.0$^{2,7}$.0$^{9,13}$]pentadeca-4,10-diene, pentacyclo[9.2.1.0$^{2,10}$.0$^{3,8}$]pentadeca-5,12-diene, and tricyclopentadiene; and the like.

As the metathesis catalyst precursor, a metathesis polymerization reaction using the metal-oxo complex of the present invention represented by the above general formula (1) may be performed in a solvent or may be performed without using a solvent. In particular, when the metal-oxo complex of the present invention represented by the general formula (1) is a compound in which at least one of $R^4$ and $R^5$ is a branched chain alkyl group that is substituted or unsubstituted and has 3 to 20 carbon atoms, since the compound shows good solubility in a monomer such as a norbornene-based monomer, by dissolving the metal-oxo complex of the present invention represented by the above general formula (1) in a monomer such as a norbornene-based monomer, polymerization reaction without using a solvent such as bulk polymerization becomes possible.

EXAMPLE

Hereinafter, the present invention will be described based on Examples, but the present invention is not limited by the Examples. Note that "part(s)" and "%" are on a weight basis unless otherwise specified.

Example 1

(Synthesis of a Compound Represented by the Formula (2); Synthesis of a Tungsten Complex of Dipivaloylmethane and Triphenyl Silanol)

285.3 mg (0.835 mmol) of tungsten oxytetrachloride was placed in a 25 mL Schlenk tube made of glass under an argon atmosphere, and subsequently 7.5 mL of toluene was added with stirring in a glass syringe. Thereafter, 184 μL (0.835 mmol) of dipivaloylmethane was added using a micro syringe at room temperature and allowed to react by continuing stirring at room temperature overnight. Next, to the obtained reaction solution, 230.8 mg (0.835 mmol) of triphenylsilanol was added at room temperature, and after that, stirring was continued for 2 days in a state of being warmed in an oil bath at 50° C. to perform a reaction. The reaction solution obtained by the reaction exhibited an orange color. Then, a volatile component contained in the obtained reaction solution was distilled off under reduced pressure and 8 mL of hexane was added thereto, so that a hexane suspension was obtained. Thereafter, insolubles were precipitated by subjecting the hexane suspension to centrifugation, a supernatant orange solution was removed, and the removed supernatant orange solution was left to stand overnight at room temperature, so that 386.5 mg (0.530 mmol) of the compound represented by the formula (2) was obtained as orange needle crystals. An yield of the compound represented by the formula (2) was 63%. The measurements of the obtained compound were as follows:

$^1$H NMR (400 MHz, $C_6D_6$) δ7.96-8.02 (s, 6H), 7.20-7.22 (s, 9H), 5.96 (s, $^1$H), 0.97 (s, 9H), 0.84 (s, 9H). IR (nujol/NaCl): 983.7 cm$^{-1}$.

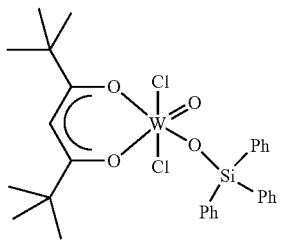

(2)

Example 2

(Synthesis of a Compound Represented by the Formula (5); Synthesis of a Tungsten Complex of Dipivaloylmethane and 1-Adamantanol)

161.9 mg (0.474 mmol) of tungsten oxytetrachloride was placed in a 80 mL Schlenk tube made of glass under an argon atmosphere, and subsequently 10 mL of toluene was added with stirring in a glass syringe. Thereafter, 99 μL (0.474 mmol) of dipivaloylmethane was added using a micro syringe at room temperature and allowed to react by continuing stirring at room temperature overnight. Then, to the obtained reaction solution, 72.2 mg (0.474 mmol) of 1-adamantanol dissolved in 5 mL of toluene was added at room temperature, and after that, stirring was continued overnight at room temperature to perform a reaction. The reaction solution obtained by the reaction exhibited an yellow color. Then, a volatile component contained in the obtained reaction solution was distilled off under reduced pressure and 5 mL of hexane was added thereto, so that a hexane suspension was obtained. Thereafter, insolubles were precipitated by subjecting the hexane suspension to centrifugation, a supernatant yellow solution was removed, and the removed supernatant yellow solution was left to stand overnight at a temperature of −20° C., so that 128.6 mg (0.212 mmol) of the compound represented by the formula (5) was obtained as yellow crystals. An yield of the compound represented by the formula (5) was 45%. The measurements of the obtained compound were as follows:

mp 135-140° C. (dec). IR (nujol/NaCl): 959 cm$^{-1}$. $^1$H NMR (600 MHz, $C_6D_6$) δ6.05 (s, $^1$H), 2.24 (m, 6H), 1.95 (s, 3H), 1.27-1.34 (m, 6H), 1.11 (s, 9H), 1.06 (s, 9H). $^{13}$C{$^1$H}NMR (151 MHz, $C_6D_6$) δ206.41, 193.27, 100.54, 95.94, 42.91, 42.08, 40.20, 35.54, 31,38, 27.35, 27. 20. Anal. Calcd for $C_{21}H_{34}Cl_2O_4W$: C, 41.67; H, 5.66. N, 0.00. Found: C, 41.88; H, 5.52. N, 0.00.

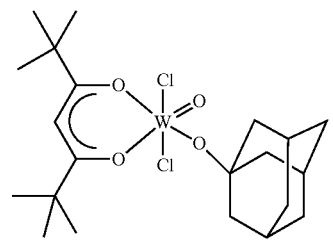

(5)

Example 3

(Synthesis of a Compound Represented by the Formula (6); Synthesis of a Tungsten Complex of Acetylacetone and 1-Adamantanol)

193.7 mg (0.567 mmol) of tungsten oxytetrachloride was placed in a 80 mL Schlenk tube made of glass under an argon atmosphere, and subsequently 10 mL of toluene was added with stirring in a glass syringe. 58 μL (0.567 mmol) of acetylacetone was added using a micro syringe at room temperature and allowed to react by continuing stirring at room temperature overnight. Then, to the obtained reaction solution, 86.3 mg (0.567 mmol) of 1-adamantanol dissolved in 5 mL of toluene was added at room temperature, and after that, stirring was continued overnight at room temperature to perform a reaction. The reaction solution obtained by the reaction exhibited an yellow color. Then, a volatile component contained in the obtained reaction solution was distilled off under reduced pressure and 5 mL of toluene was added thereto, so that a toluene suspension was obtained. Thereafter, insolubles were precipitated by subjecting the toluene suspension to centrifugation, a supernatant yellow solution was removed, 10 mL of hexane was added to the removed supernatant yellow solution, and the supernatant yellow solution was left to stand overnight at a temperature of −20° C., so that 143.8 mg (0.276 mmol) of the compound represented by the formula (6) was obtained as yellow crystals. An yield of the compound represented by the formula (6) was 49%. The measurements of the obtained compound were as follows:

mp 100-105° C. (dec). IR (nujol/NaCl): 962 cm$^{-1}$. $^1$H NMR (600 MHz, $C_6D_6$) δ5.07 (s, $^1$H), 2.25 (m, 6H), 1.93 (s, 3H), 1.53 (s, 3H), 1.48 (s, 3H), 1.31-1.24 (m, 6H). $^{13}$C{$^1$H}NMR (151 MHz, $C_6D_6$) δ196.38, 183.99, 109.68, 96.87, 42.86, 35.51, 31.50, 27.33, 24.93. Anal. Calcd for $C_{15}H_{22}Cl_2O_4W$: C, 34.58; H, 4.26. N, 0.00. Found: C, 34.72; H, 4.19. N, 0.00.

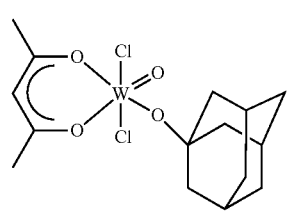

(6)

Example 4

(Synthesis of a Compound Represented by the Formula (8); Synthesis of a Tungsten Complex of Dipivaloylmethane and 2,4,4-Trimethyl-2-Pentanol)

37.2 mg (0.109 mmol) of tungsten oxytetrachloride was placed in a 25 mL Schlenk tube made of glass under an argon atmosphere, and subsequently 2 mL of benzene-d6 was added with stirring in a glass syringe. 22.7 µL (0.109 mmol) of dipivaloylmethane was added using a micro syringe at room temperature and allowed to react by continuing stirring at room temperature overnight. Then, to the obtained reaction solution, 17.2 µL (0.109 mmol) of 2,4,4-trimethyl-2-pentanol was added using a micro syringe at room temperature, and after that, stirring was continued for 1 day at room temperature to perform a reaction. The reaction solution obtained by the reaction exhibited a red color. Then, a volatile component contained in the obtained reaction solution was distilled off under reduced pressure, so that the compound represented by the formula (8) was obtained as a red liquid. The measurements of the obtained compound were as follows:

$^1$H NMR (400 MHz, $C_6D_6$) δ5.72 (s, $^1$H), 1.70 (s, 2H), 1.47 (s, 6H), 1.07 (s, 9H), 0.95 (s, 9H, s, 9H). $^{13}C\{^1H\}$NMR (151 MHz, $C_6D_6$) δ201.61, 90.69, 57.77, 34.73, 32.24, 31.38, 30.09, 27.37, 26.96, 26.74, 26.71, 26.30.

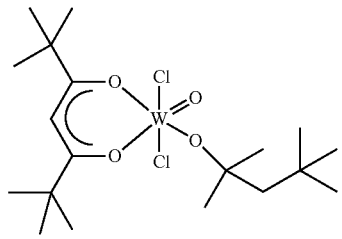

(8)

Example 5

(Solution Polymerization Reaction of Dicyclopentadiene Using the Compound Represented by the Formula (2))

The compound represented by the formula (2) obtained in Example 1 was dissolved in toluene to prepare a solution of 0.020 mmol/mL. The solution was used as a catalyst solution (a). Separately, a toluene solution of diethylaluminum chloride ($Et_2AlCl$) of 0.040 mmol/mL was prepared. This toluene solution was used as an activator solution (β).

A stir bar was placed in a glass screw bottle and replaced under an argon atmosphere. In the argon atmosphere, 10.6 mL (10 mmol) of a toluene solution of dicyclopentadiene having 0.929 mmol/mL was added to the screw bottle using a glass syringe. Thereafter, at room temperature, 0.5 mL (0.01 mmol) of the catalyst solution (a) and 0.5 mL (0.02 mmol) of the activator solution (B) prepared above were added in this order, and the screw bottle was sealed under the argon atmosphere. Then, while stirring the contents of the screw bottle, the screw bottle was placed in an aluminum block constant temperature bath at 80° C. for 30 minutes to proceed a polymerization reaction. After completion of the polymerization reaction, 50 mL of methanol was added thereto, and the obtained polymer was separated out, and the separated out polymer was removed by filtration, washed with hexane, and dried at room temperature under reduced pressure, so that a polymer of dicyclopentadiene in a solid state was obtained. The weight of the obtained polymer was 1.6438 g.

Example 6

(Solution Polymerization Reaction of Norbornene Using the Compound Represented by the Formula (2))

In place of the toluene solution of dicyclopentadiene, 10.0 mL (2 mmol) of a toluene solution of norbornene having 0.2 mmol/mL was added. Except for this, polymerization operations were carried out in the same manner as in Example 5 to obtain a polymer of norbornene in a solid state. The weight of the obtained polymer was 0.1587 g.

Example 7

(Bulk Polymerization Reaction of Dicyclopentadiene and Tricyclopentadiene Using the Compound Represented by the Formula (2))

Under a nitrogen atmosphere, triethylaluminum was added to dipropylene glycol dimethyl ether and mixed to obtain an activator solution A so that the concentration of triethylaluminum became 0.13%.

To a mixture of norbornene monomers consisting of 90 parts of dicyclopentadiene and 10 parts of tricyclopentadiene, the compound represented by the formula (2) obtained in Example 1 was added so that the amount of tungsten became 3.8 mmol/kg, and mixed to obtain a reaction stock solution B.

A nitrogen-substituted 50 mL vessel was placed under a condition of 30° C., and 20 g of the reaction stock solution B at 30° C. that had been previously nitrogen-substituted was poured into the above vessel by a glass syringe and stirred by a stirring device. To this, 0.2 g of the activator solution A was injected in a glass syringe and mixed for 10 seconds. At this time, white smoke was generated as the polymerization reaction was proceeded. In the present example, time from start of mixing of the activator solution A and the reaction stock solution B to generation of the white smoke was defined as "curing time". In Example 7, the curing time was 38 seconds, and the reaction provided a polymer of dicyclopentadiene and tricyclopentadiene.

Example 8

(Bulk Polymerization Reaction of Dicyclopentadiene and Tricyclopentadiene Using the Compound Represented by the Formula (5))

In place of the compound represented by the formula (2) obtained in Example 1, the compound represented by the formula (5) obtained in Example 2 was used. Except for this, a reaction stock solution B was obtained in the same manner as in Example 7.

Then, a polymerization reaction was carried out in the same manner as in Example 7 using the activator solution A obtained in the same manner as in Example 7 and the reaction stock solution B obtained above. In Example 8, the curing time was 90 seconds, and the reaction provided a polymer of dicyclopentadiene and tricyclopentadiene.

Example 9

(Evaluation of Stability in Air of the Compounds Represented by the Formula (2))

The compound represented by the formula (2) obtained in Example 1 was stored in air at room temperature, and change of color of the compound represented by the formula (2) was visually confirmed after the storage. In addition to this, the bulk polymerization of dicyclopentadiene and tricyclopentadiene was performed in the same manner as in Example 7 using the compound represented by the formula (2) after the storage and the curing time was measured, thereby the stability in air was evaluated.

As a result, no change of color was observed in the compound represented by the formula (2) even after one week. Further, when the bulk polymerization was performed using the compound represented by the formula (2) after storage for one week, the curing time was 38 seconds, and the same results as in Example 7 above were obtained. From this result, it can be judged that the compound represented by the formula (2) has the high stability in air.

Example 10

(Evaluation of Stability in Air of the Compounds Represented by the Formula (5))

The evaluation of the stability in air was performed in the same manner as in Example 9 using the compound represented by the formula (5) obtained in Example 2 in place of the compound represented by the formula (2).

As a result, no change of color was observed in the compound represented by the formula (5) even after one week. Further, when the bulk polymerization was performed using the compound represented by the formula (5) after storage for one week, the curing time was 90 seconds, and the same results as in Example 8 above were obtained. From this result, it can be judged that the compound represented by the formula (5) has the high stability in air.

Comparative Example 1

(Evaluation of Stability in Air of (2,6-diisopropylphenyl imide) {3,3'-di(t-butyl)-5,5',6,6'-tetramethyl-2,2'-biphenoxy} neophyllidene Molybdenum (VI))

The evaluation of the stability in air was performed in the same manner as in Example 9 using a molybdenum complex ((2,6-diisopropylphenyl imide) {3,3'-di(t-butyl)-5,5',6,6'-tetramethyl-2,2'-biphenoxy} neophilidene molybdenum (VI), available from Stream Co. Ltd,) in place of the compound represented by the formula (2), and the color changed to black immediately after exposure to air. In addition, in the same manner as in Example 9 above, operations of the bulk polymerization of dicyclopentadiene and tricyclopentadiene were performed using the molybdenum complex immediately after the exposure to air; however, the bulk polymerization did not proceed. From this, it can be said that the molybdenum complex ((2,6-diisopropylphenyl imide) {3,3'-di(t-butyl)-5,5',6,6'-tetramethyl-2,2'-biphenoxy} neophilidene molybdenum (VI)) is inferior in the stability in air.

Evaluation

From the results of the above Examples and Comparative Example, it can be said that the metal-oxo complex of the present invention represented by the general formula (1) can be suitably used as a metathesis catalyst precursor, and further exhibits the high stability in air.

The invention claimed is:

1. A metal-oxo complex represented by the following general formula (1),

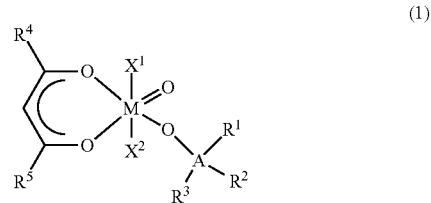

(1)

wherein in the general formula (1) above, "M" represents a molybdenum atom or a tungsten atom; "A" represents a carbon atom, a silicon atom, a germanium atom, a tin atom or a lead atom; $X^1$ and $X^2$ each independently represent a halogen atom; $R^1$ to $R^5$ each independently represent a hydrogen atom, a straight or branched chain alkyl group that is substituted or unsubstituted and has 1 to 20 carbon atoms, or a substituted or unsubstituted aryl group having 6 to 20 carbon atoms; each of $R^1$ to $R^3$ may be bonded to one another to form a ring.

2. The metal-oxo complex according to claim 1, wherein in the general formula (1), "A" is a carbon atom or a silicon atom.

3. The metal-oxo complex according to claim 1, wherein in the general formula (1), at least one of $R^4$ and $R^5$ is a substituted or unsubstituted branched chain alkyl group having 3 to 20 carbon atoms.

4. The metal-oxo complex according to claim 1, wherein the metal-oxo complex is any one of the compounds represented by the following formulae (2) to (10)

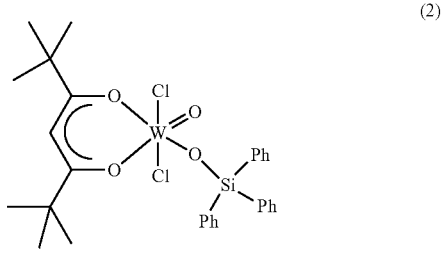

(2)

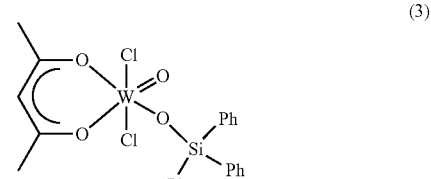

(3)

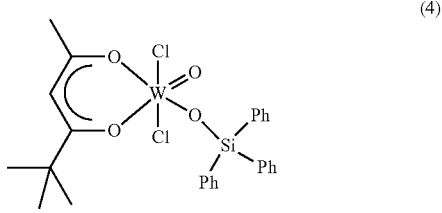

(4)

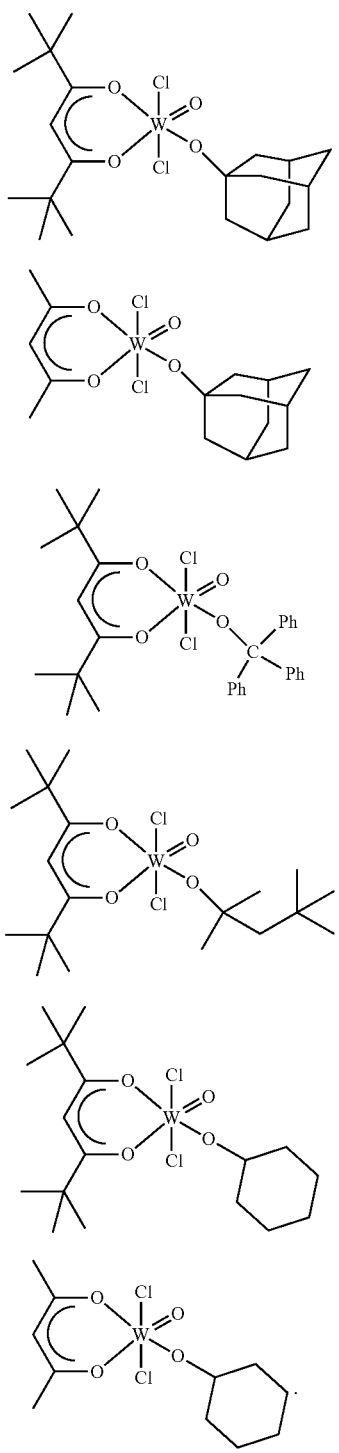

5. A method for producing the metal-oxo complex according to claim 1, comprising:

reacting a compound represented by the general formula (11) of $MOX^1{}_2X^2{}_2$ with a compound represented by the following general formula (12) below; and then reacting with a compound represented by the following general formula (13),

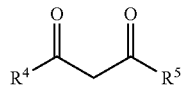

(12)

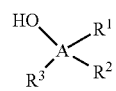

(13)

wherein in the general formulae (11) to (13) above, "M" represents a molybdenum atom or a tungsten atom; "A" represents a carbon atom, a silicon atom, a germanium atom, a tin atom or a lead atom; $X^1$ and $X^2$ each independently represent a halogen atom; $R^1$ to $R^5$ each independently represent a hydrogen atom, a straight or branched chain alkyl group that is substituted or unsubstituted and has 1 to 20 carbon atoms, or a substituted or unsubstituted aryl group having 6 to 20 carbon atoms; each of $R^1$ to $R^3$ may be bonded to one another to form a ring.

6. A method for producing a polymer comprising: contacting the metal-oxo complex according to claim 1 with an organometallic compound to activate the metal-oxo complex; and metathesis polymerizing a norbornene-based monomer in the presence of the activated metal-oxo complex.

7. The method for producing a polymer according to claim 6, wherein the organometallic compound is an organometallic compound of a metal of groups 11 to 14 of the periodic table.

8. A metathesis polymerization catalyst produced by reacting the metal-oxo complex according to claim 1 with an organometallic compound.

9. The metathesis polymerization catalyst according to claim 8, wherein the organometallic compound is an organometallic compound of a metal of groups 11 to 14 of the periodic table.

\* \* \* \* \*